No. 860,609. PATENTED JULY 16, 1907.
C. P. SESTER.
SEEDING MACHINE.
APPLICATION FILED SEPT. 27, 1905.
3 SHEETS—SHEET 1.
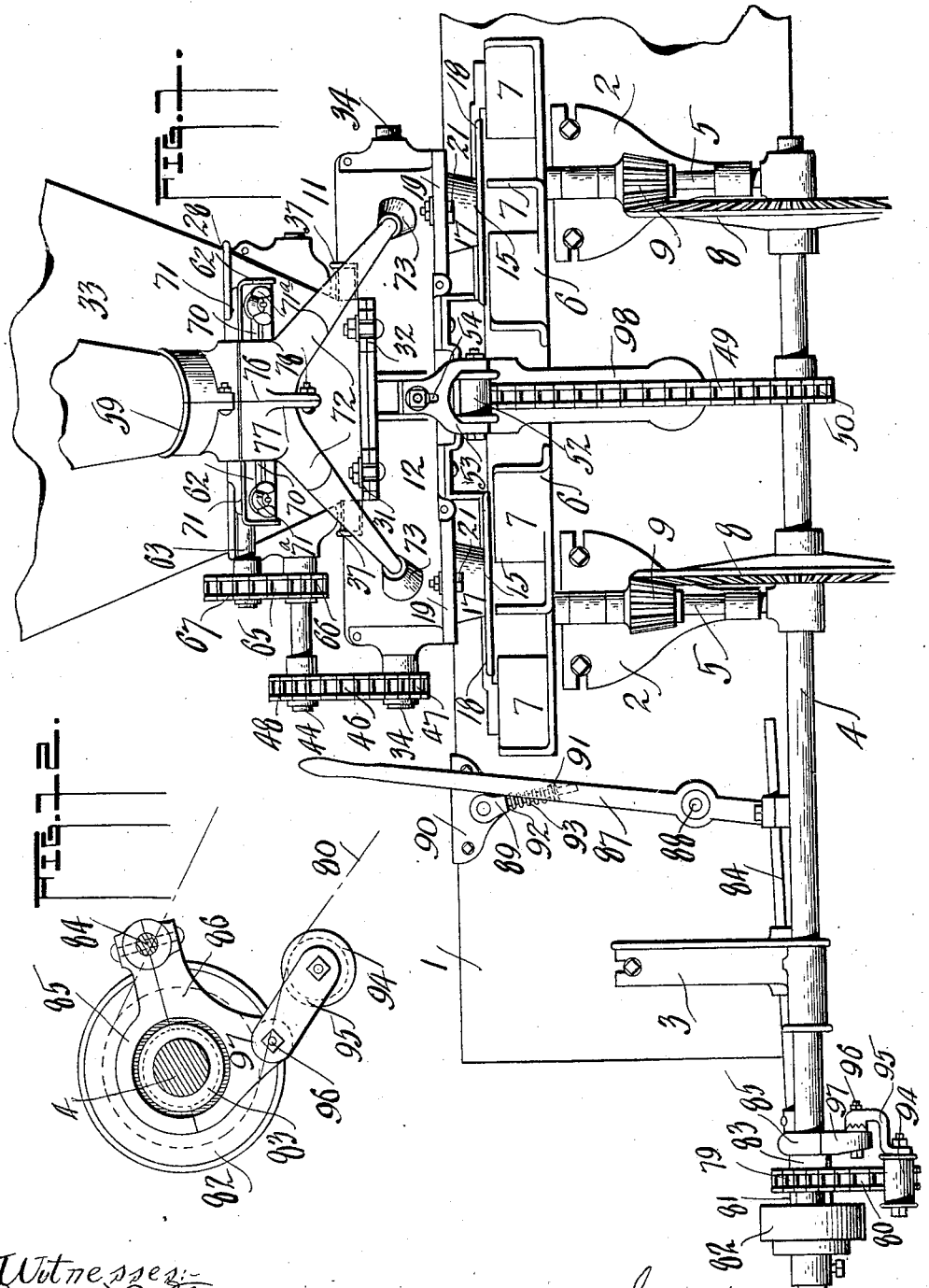

No. 860,609. PATENTED JULY 16, 1907.
C. P. SESTER.
SEEDING MACHINE.
APPLICATION FILED SEPT. 27, 1905.
3 SHEETS—SHEET 2.
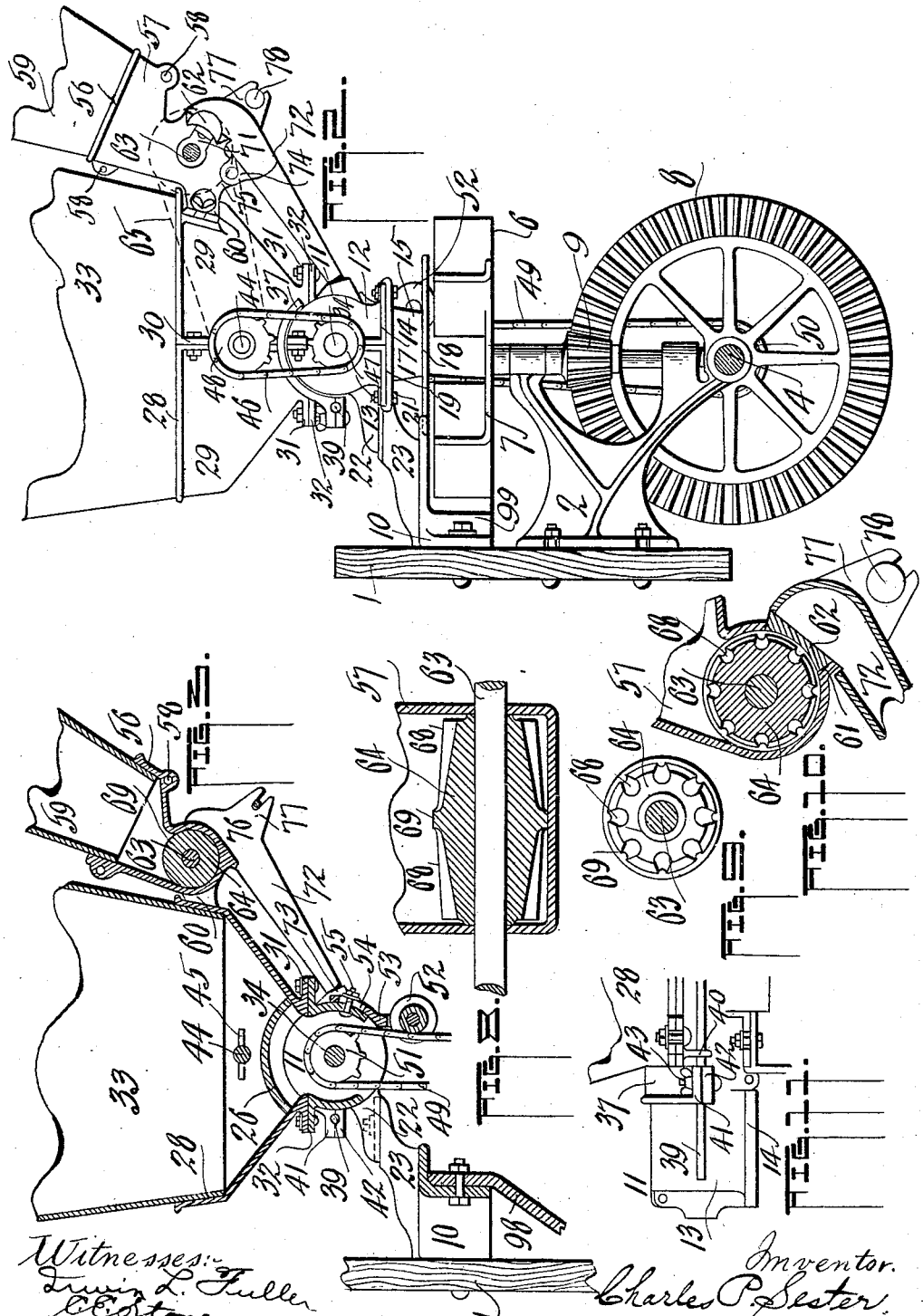

No. 860,609. PATENTED JULY 16, 1907.
C. P. SESTER.
SEEDING MACHINE.
APPLICATION FILED SEPT. 27, 1905.
3 SHEETS—SHEET 3.
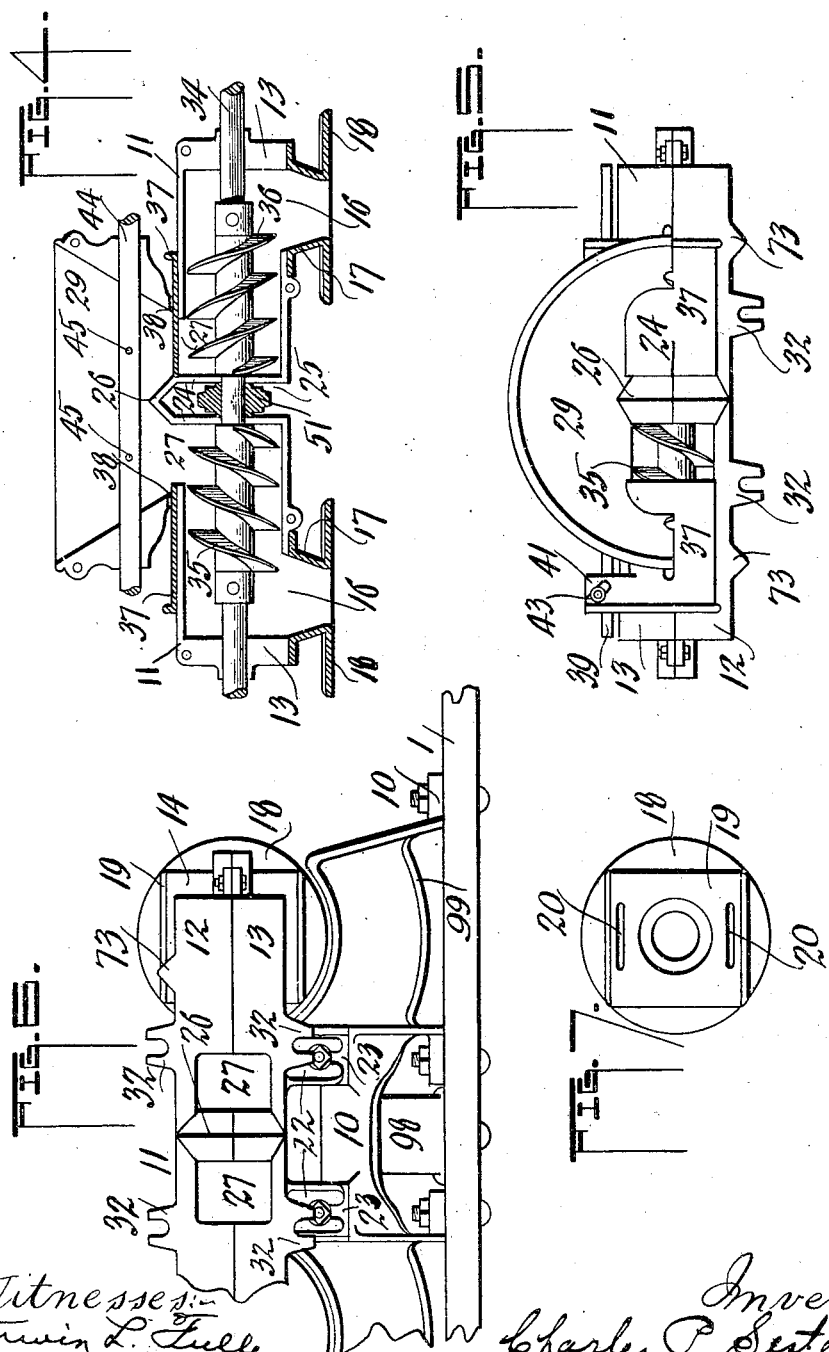

UNITED STATES PATENT OFFICE.

CHARLES P. SESTER, OF PEORIA, ILLINOIS.

SEEDING-MACHINE.

No. 860,609. Specification of Letters Patent. Patented July 16, 1907.

Application filed September 27, 1905. Serial No. 280,249.

*To all whom it may concern:*

Be it known that I, CHARLES P. SESTER, a citizen of the United States, residing at Peoria, in the county of Peoria and State of Illinois, have invented certain new and useful Improvements in Seeding-Machines; and I do hereby declare that the following is a full, clear, and exact description of the invention, which will enable others skilled in the art to which it appertains to make and use the same.

This invention has reference to certain new and useful improvements in seeding machines and has particular reference to the general type of broad cast distributers wherein two distributing fans are employed for receiving and distributing broadcast suitable seed or grain.

One of the objects of the present invention is to produce a seed distributing machine, which may be attached to and be supported on an end-gate; the same provided with left and right augers adapted to receive seed at their inner ends and convey the same to their outer ends where it is deposited on spaced fans or distributers for distributing the same broadcast over the ground.

A further object of the said invention, is to combine with such auger feed, means for delivering the grass-seed to be mixed with the seed conveyed by the augers, prior to the discharge of the seed onto the fans.

For a further and full description of the invention herein and the merits thereof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which,:—

Figure 1, is a front elevation of a broadcast distributing machine containing my improvements; Fig. 2 is a side elevation of one side of my improved seeding machine, and illustrating the grass seed driving means in dotted lines; Fig. 3 is a central vertical section through the upper portion of my distributing machine; Fig. 4 is a central longitudinal section taken through the cylindrical casing containing the right and left auger or screw feed and also showing the adjustable feed ways attached to such casing; Fig. 5 is a plan view of the upper portion of my said improvement, particularly the cylindrical casing containing the right and left auger feed, the slide valves, one of which is here shown open, the other closed and one-half section of the superposed hopper above the said casing; Fig. 6 is a partial plan view of a supporting frame or casting which is secured to an end gate and showing the manner of adjustably attaching the cylindrical casing containing the augers thereto; Fig. 7 is a detached view in plan of one of the adjustable feed ways which is attached to the cylindrical casing containing the right and left auger, and which is disposed above the fan distributer; Fig. 8 is a longitudinal section, enlarged, of the fluted feeding roller for the grass seed attachment; Fig. 9 is an end view of the fluted feed roller of the grass seed attachment; Fig. 10 is a cross section through the grass seed attachment, showing the fluted roller, one of the slide valves and one of the feed spouts attached thereto; Fig. 11 is a detail rear elevation of parts of the casing of the machine showing the manner of supporting and adjusting the slide valves above the auger feed; and Fig. 12 is an enlarged side elevation of an adjustable chain tightener which is employed in connection with the driving shaft for the driving chain from the said shaft to the gear carried by one of the wagon wheels.

Like numerals of reference indicate corresponding parts throughout the figures.

In the drawings 1 denotes an end gate, which is of the usual form to which is secured a pair of brackets 2 duplicates of each other and a bracket 3. In the brackets last referred to is journaled one end of the drive shaft 4, while in the brackets 2 is journaled the short vertical shafts 5 on the upper ends of which are carried the fan distributers 6. The said fan distributers are provided with the ordinary shaped wings 7, but which stop short of the center of said distributers substantially as shown in the drawings. The shaft 4 is driven in the usual manner from the ground wheel of a wagon, not shown, on which the said seed distributer is supported. And I have shown as a means of transmitting power from the shaft 4 to the shafts 5 bevel gears 8 on the shaft 4 in mesh with the pinions 9 on the shafts 5; although any other suitable gearing such as gears with spiral teeth or friction gears may be substituted.

10 denotes a combined bracket support and a distributer shield. Laterally adjustable on the support 10 is a substantially cylindrical and elongated casing 11 composed of the semicylindrical sections 12 and 13, having webbed portions at their opposite ends by means of which they may be suitably connected together, and the lower portions of said castings at their opposite ends are provided with flange portions 14, which have secured thereto the feed ways 15 which communicate with openings 16 in the said casing 11. The feed ways 15 consist of short tapered and tubular necks 17 having the lower annular flange or shield 18 and the upper substantially squared flange 19 by means of which the said feed ways may be connected to the flanges 14 of the sections 12 and 13 of the casing 11. To adapt the feed ways 15 to be longitudinally adjusted on the sections of the casing 11, I provide the flanges 19 of the feed ways 15 with the elongated slots 20 to adapt the feed ways to be shifted upon the loosening of bolts 21, which is the means here employed for connecting the feed ways to the casing 11 as described. To adapt the casing 11 to be laterally adjusted on the support 10, I have provided a pair of slotted ears 22 adapted to rest upon and be secured to extensions 23 of the said support 10.

With the arrangement of the casing 11 and the feed ways 15 as above described, I am enabled, for purposes to be further set forth, to move the entire casing 11 towards or from the end gate 1 and also shift the feed ways 15 towards or from the center of the said casing 11.

Describing more fully the construction of the casing 11, the same is provided with a pair of central inner walls or partitions 24, separated from each other a suitable distance forming the open way 25, the said partitions 24 or inner walls having the upwardly inclined or united converging portions 26. When the sections 12 and 13 are connected the partitions 24 and converging portions 26 unite to form a general partition through the said casing 11 and an overhanging inclosure for the open way 25. For a short distance on each side of the partitions or walls 24 the upper wall of the casing or the sections 12 and 13 thereof is provided with the rectangular cut out portions 27 forming a feed way to the interior casing 11.

Supported by the casing 11 is a hopper support 28 consisting of a pair of substantially similar sections or castings 29 having the upper matching web portions 30 by means of which they may be connected together, and the said sections overlie a portion of the casing 11 and are provided with slotted ears 31 by means of which they may be bolted or otherwise suitably secured to corresponding ears 32 of the sections 12 and 13 of the casing 11. As here shown the hopper support 28 tapers from its upper outer edge to the casing with which it communicates and supports the hopper 33.

Revolubly carried and longitudinally disposed in the casing 11 and passing through the partitions 24 therein is a shaft 34, and on this shaft is carried right and left augurs 35 and 36 adapted to convey material which may be discharged into the casing 11 to the opposite ends of such casing, and discharge it out through the openings 16 therein, to and through the feed ways 15 onto the distributers 6 revolving therebeneath. To control the flow of material from the hopper and the hopper support to the casing 11 through the openings 27 in the upper wall thereof, I have provided slide valves 37, which are longitudinally adjustable on the casing 11 for the purpose of closing either of the openings 27 in the casing 11, substantially as seen in Figs. 4 and 5; the said slide valves as will be understood operate through suitable slotted ways 38 in the walls of the sections of the hopper support 28. The said slide valves 37 are adapted to be adjustably and slidably carried on a longitudinal rod 39 which is passed through ears 40 attached to the casing 11, more particularly seen in Fig. 11. The means employed for adjusting and securing the slide valves 37 is through the offsets 41 connected to half boxings 42 through the winged nuts and connecting bolts, referred to generally as 43, thus it will be seen that the quantity of material which is fed to the augur feed of the casing 11 is governed entirely through the adjustment of the slide valves 37, by means of which more or less material may be allowed to enter the casing 11 through the openings 27 described.

Journaled in the hopper support 28 is an agitating shaft 44, carrying the agitators 45 and such shaft is driven by means of a sprocket chain 46 engaging a sprocket pinion 47 on the shaft 34 and a sprocket pinion 48 on the outer end of such agitating shaft. And the mode of transmitting motion or power to the augur shaft 34 is by means of a chain drive 49 engaging a sprocket wheel 50 on the driving shaft 4, and passing up intermediate the two distributing fans 6 operates through the open way 25 of the casing 11 and engages a sprocket pinion 51 on the shaft 34 between the matching walls or partitions 24 of the said casing 11.

Operating the auger shaft in the manner in which I do, by means of a driving chain extending up intermediate the distributing fan, obviates the obstruction of the cast of grain or other material from the fan distributers, which would be the case if the drive were arranged to connect the outer end of either end of the auger shaft 34; and through the provision of the converging wall 26 of the partitions 24, I provide a shed or inclosure for the pinion 51 and the drive chain 49 and form a feed way together with the openings 27 in the casing 11 to adapt an easy flow of material from the hopper and its support to the interior of the casing 11. I have provided a guide and chain tightener for the driving chain 49, consisting of a sheave wheel 52, which is carried by a depending bracket 53 adjustably supported on the outer section 12 of the casing 11. The said bracket 53 has a concave face adapted to match the convex surface of the section 12, so that in the adjustment of said bracket and the sheave wheel thereon the said sheave wheel may be adjusted toward and from the chain. The upper end of the said bracket is slotted as at 54 to adapt it for adjustment when the bolt 55, which supports the same is loosened.

The devices, that is the feeding devices, which have been referred to are employed mainly for conveying grain, such as oats, wheat, etc., from a hopper to distributing fans for discharging it broadcast over a field. I will now describe a grass seed attachment for conveying such seed from a hopper to the point in the casing 11 where the grain is discharged into a feed way from which it is deposited onto the fan distributers, at which point the grass seed and grain is mixed before its discharge onto the distributers.

56 refers generally to a hopper support consisting of the matching sections 57 suitably secured together through the ears 58. The said sections support a hopper 59 and are provided with ears 60 by means of which they may be bolted or otherwise suitably secured to one of the sections 29 of the hopper support 28, see Fig. 2. The sections of the hopper 56 are provided with an open way 61 controlled by oppositely movable slide valves 62, and extending through the said hopper support and journaled in the opposite walls thereof is a short shaft 63, on which is revolubly mounted a fluted force feed roller 64 and the drive for the said shafts 63 is through a sprocket chain 65 engaging a sprocket pinion 66 on the agitating shaft 44, and a sprocket pinion 67 carried on the shaft 63. See Fig. 1. for a front elevation and Fig. 2. for a side elevation, however in the latter view the drive is shown in dotted lines.

Referring to the force feed roller 64, the same is provided with oppositely projected fluted portions 68 divided by a central flange or partition 69. The flutes of the fluted portion 68 tapered downwardly from the flange portion 69 to the outer ends of the said roller and the outer ends of the flutes are flared, or in other words the walls of the flutes converge from their greatest width which is at the ends of the roller to the central flange or partition thereof where they are in very close proximity to each other; it is preferable to have the flutes substantially semicircular or concave as shown in Figs. 9 and 10. The object of providing a fluted force feed roller where the flutes thereof taper from a central point downwardly and outwardly to the ends of the said roller is to gradually increase the feed of material from the hopper through the force feed roller to the feeding devices heretofore described. The feed of the material being regulated by the adjustment of the slide valves 62, which, if moved outwardly a short distance will allow a small quantity of material to be discharged by the fluted roller and as the slide valves are moved further outwardly it will be seen that the flow of material will rapidly increase, owing not only to the openings of the valves but through the exposure of the flutes, the widths and depths of which increase toward their outer ends. The slide valves 62 are slotted as at 70 and move adjacent to bracket 71 extending out from the sections 57 of the hopper support 56 through which the shaft 63 is carried and the same are adjustably held by means of the winged nuts and bolts referred to generally as 71$^a$.

Attached to the hopper support 56 is a pair of depending and diverging spouts 72, preferably tapered as shown in the drawings and having their lower ends seated in the tubular bosses 73 projecting out from the sections 12 of the casing 11, at or near their opposite ends, and preferably at points where material is conveyed through the tubes 72 will be discharged above the feed ways 15, of the openings 16 in the casing 11 to insure the commingling of the grass seed and grain. The upper ends of the spouts 72 are secured to the hopper support by means of ears 74 adapted to be secured to ears 75 forming a part of the sections 57 of such support. The said spouts, where they unite at their upper ends, are provided with matching walls 76 which lie in juxtaposition to each other, and have the extending ears 77, which are bolted together as shown at 78. The position of the upper ends of the spouts are such, that when the slide valves 62 are open, seed may pass from the hopper 56 to said spouts.

The object of adjusting the casing 11 on its support or the feed ways 15 on the said casing, is to regulate the feed of grain and grass seed onto the fan distributers. If it is found that the cast of the material from the distributers is too much to one side or the other, then the feed ways 15 will be adjusted longitudinally of the casing 11. If the cast of the material is too near the board it should be regulated to be cast nearer thereto, to do this the casing 11 should be adjusted inwardly or outwardly on the support 10. By this means I am enabled to discharge the material onto the distributers at desired points and also regulate the cast from such distributers. For this purpose, I prefer to employ fan distributers having wings substantially as here shown.

On the outer end of the driving shaft 4, is carried the usual pinion 79, which is driven by means of a sprocket chain 80, from a driving sprocket (not shown) attached to the axle or one of the ground wheels of a wagon (not shown). The sprocket pinion 79 is provided with the usual clutch faces 81 adapted to have engagement with any well known form of clutch mechanism 82. The pinion 79 is slidable on the shaft 4, and is provided with the grooved sleeve 83. I will now describe the means of shifting the pinion 79 and its parts, and also an adjustable chain tightener and guide for the chain 80.

84 denotes a reciprocal rod which is slidably carried through the bracket 3 and on its outer end has fixedly attached thereto arms 85 and 86, with portions engaging the grooved sleeve 83. It will be seen that upon shifting the rods 84 longitudinal movement may also be imparted to the sprocket pinion 79 through the engagement of the arms 85 and 86 with the grooved sleeve thereof. To accomplish this movement, I provide a lever 87 pivoted at 88 to the board 1, its lower end being suitably connected to the rod 84. And for the purpose of locking the position of the lever 87, when once shifted, I provide the oscillating rod 80, pivoted to a bracket 90 secured to the board 1, the free end of the rod passing loosely through a plate 91 between which and an upper shoulder portion 92 is coiled a spring 93. Thus it will be seen upon shifting the lever 87 across the pivot of the rod 89 through the action of the spring 93, it will throw the rod into a position to lock the lever, against accidental displacement through the vibration or jar of the wagon.

94 denotes a sheave wheel over which it is adapted to carry the chain 80 and the same is carried by an arm 95 secured by a bolt 96 to an ear 97 of the arm 86. The connection of the arm 95 with the ear 97 is through a boss on the said ear 97 which has a serrated face matching a corresponding serrated face on the end of the arm 95. Thus with the loosening of the bolt 96 the serrated faces of the arm 95 and the ear 97 may be separated and the arm 95 swung into a desirable position and again locked, the serrated faces preventing the release or undue oscillation of the arm 95 through the vibration or the movement of the wagon.

As a supplemental support for the support 10 and the parts carried thereby, I have provided the brace 98 as shown.

The bracket support 10 was referred to as a support and distributer shield, the shield portion being indicated as 99 of substantially semicircular shape depending from the support 10 at the rear of the distributers.

Having thus fully described my invention, what I claim and desire to secure by Letters Patent of the United States, is:—

1. In a seeding machine, the combination of a removable end-gate for vehicles, a casing having a pair of feed openings central thereof and discharge openings at its opposite ends, a right and left auger operating in the opposite ends of said casing, and a pair of distributing fans each of which is revolubly mounted beneath the discharge openings in the casing aforesaid.

2. In a seeding machine, the combination of two broadcast distributing fans, mechanism for actuating the said fans, a right and left auger feed each of which is adapted to deliver material to one of said distributers, and mechanism for actuating the said auger feed simultaneously with the actuation of the distributers.

3. In a seeding machine, the combination of two broadcast distributing fans, a right and left auger feed each of which is adapted to deliver material to one of said distributers, a driving shaft for actuating said distributers, and driving connections between the said shaft and the auger feed the same operating intermediate the said feed.

4. In a seeding machine, the combination of two distributing fans, an auger feed for delivering material to the said distributers, a grass seed attachment, and means for delivering material therefrom to be mixed with the material fed by the auger feed prior to its deposit on the said distributers.

5. In a seeding machine, the combination of two distributing fans, a casing supported above said fans, a right and left auger within the said casing each of which is adapted to deliver material to one of said fans, and a grass seed attachment suitably supported and adapted to deliver material therefrom to the opposite ends of the said casing.

6. In a seeding machine, the combination of two distributing fans, an elongated tubular casing provided with discharge openings at its opposite ends, an auger feed in said casing adapted to deliver material therefrom through the openings therein onto said fans, a grass seed attachment, and means for delivering material therefrom into the opposite ends of the said casing and above the openings therein.

7. In a seeding machine, the combination of a removable end-gate for vehicles, a casing having a pair of feed openings central thereof and discharge openings at its opposite ends, a pair of slide valves for closing the respective feed openings, a right and left auger operating in the opposite ends of said casing, and a pair of distributing fans each of which is revolubly mounted beneath the discharge openings in the casing aforesaid.

8. In a seeding machine, the combination of a removable end-gate for vehicles, an elongated substantially cylindrical casing supported by said end-gate and provided with discharge openings at its opposite ends, feed ways supported to coincide with the openings in said casing and adjustable lengthwise of the axis thereof, a right and left auger in said casing adapted to convey material from a central point in the casing to the discharge openings therein, and means for controlling the delivery of material to both or only one of said augers.

9. In a seeding machine, the combination of a removable end-gate for vehicles, a casing provided with discharge openings at its opposite ends, feed ways supported by said casing to coincide with the openings in said casing and adjustable lengthwise of the axis thereof, a right and left hand auger operating in the opposite ends of said casing, and mechanism for actuating such auger.

10. In a seeding machine, the combination of a casing provided with discharge openings at its opposite ends, adjustable feed ways connected with the casing and adapted to coincide with the openings therein, a right and left hand auger operating in the opposite ends of said casing, means for operating the auger and means for controlling the flow of material to such casing.

11. In a seeding machine, the combination with a support, of a casing laterally adjustable on said support, feed ways longitudinally adjustably connected with the said casing, a force feed consisting of a right and left auger revoluble in the casing and adapted to deliver material in opposite directions therein and to the feed ways connected therewith, and means for controlling the delivery of material to the said casing.

12. In a seeding machine, the combination of a substantial cylindrical casing provided with a pair of spaced inner walls forming an open chamber central of said casing, a shaft passing through the said casing, and the partitions thereof, right and left auger sections on the shaft within the casing upon the opposite sides of the walls thereof, a driving pinion on said auger shaft and between the walls of the casing aforesaid, and driving connections with said pinion.

13. In a seeding machine, the combination of a casing provided with discharge openings at its opposite ends and having a pair of spaced inner walls forming an open chamber, an auger shaft passing through the casing and walls aforesaid, a right and left auger within the said casing and on the opposite sides of the said walls thereof, driving connections for the said auger shaft in the open chamber of the casing, means for controlling the delivery of material to said casing, and a distributing fan revolubly mounted beneath the discharge openings of the opposite ends of the said casing.

14. In a seeding machine, a casing having discharge openings near its opposite ends, a right and left auger feed in the casing adapted to convey material to the said openings in the casing, distributing fans revolubly supported beneath the openings of the said casing, and feed ways adjustably connected with the casing for regulating the discharge of material from the ends of the casing on to the fans.

15. In a seeding machine, the combination of a removable end-gate for vehicles, a casing having a pair of feed openings central thereof and discharge openings at its opposite ends, a right and left auger operating in the opposite ends of said casing, a pair of distributing fans each of which is revolubly mounted beneath the discharge openings in the casing aforesaid, and mechanism for simultaneously actuating said augers and distributing fans.

16. In a seeding machine, the combination of a removable end-gate for vehicles, a casing supported thereby and having discharge openings at its lower opposite ends, a shaft revolubly mounted in the casing, right and left auger sections on said shaft adapted to receive and convey material from the center of the casing to the discharge openings at its opposite ends, and a pair of spaced distributing fans, each of which is revolubly mounted beneath the discharge openings in said casing.

17. In a seeding machine, the combination with a support, of a casing attached to the said support, feed ways longitudinally and adjustably connected with the said casing, a force feed consisting of a right and left auger revoluble in the casing and adapted to deliver material in opposite directions therein and to the feed ways connected therewith, and means for controlling the delivery of material to the said casing.

18. In a seeding machine, the combination of a casing having discharge openings at its opposite ends and formed with center spaced walls connected overhead, a longitudinal shaft in the casing passing through the spaced walls thereof, a right and left auger on said shaft, the same being spaced apart by the interposition of said spaced walls, distributing fans located beneath the openings in the casing and driving mechanism for the said shaft arranged thereon intermediate the spaced walls of the said casing.

19. In a seeding machine, the combination of a casing having discharge openings at its opposite ends and formed with center spaced walls connected overhead, a longitudinal shaft in the casing, a seed receptacle above the casing, means for controlling the flow of material of seed therefrom into the said casing and driving mechanism for the said shaft arranged thereon intermediate the spaced walls of the said casing.

20. In a seeding machine, the combination of a casing having discharge openings at its opposite ends and formed with center spaced walls connected overhead, a longitudinal shaft in the casing, a seed receptacle above the casing, means for controlling the flow of seed therefrom into the said casing, feed ways adjustably connected with the casing for regulating the material through the openings thereof on to the fans and driving mechanism for the said shaft arranged thereon intermediate the spaced walls of the said casing.

21. In a seeding machine, the combination of a casing having discharge openings at its opposite ends and formed with spaced inner walls for dividing the casing into two separate chambers, an auger feed in the chambers of the casing for conveying material therein to the discharge openings thereof, distributing fans located beneath the openings in the casing, and valve mechanism for controlling the inlet of material to each chamber of the said casing.

22. In a seeding machine, the combination of a revoluble end-gate for vehicles, a casing having a pair of feed openings central thereof and discharge openings at its opposite ends, a pair of slide valves for closing the respective feed openings, a right and left auger operating in the opposite ends of said casing, a pair of distributing fans each of which is revolubly mounted beneath the discharge openings in the casing aforesaid, and mechanism for simultaneously actuating the said augers and distributing fans.

23. In a seeding machine, the combination of a removable end-gate for vehicles, a casing having a pair of feed openings central thereof, and discharge openings at its opposite ends, a right and left auger operating in the opposite ends of said casing, a hopper support mounted above said casing, an agitating shaft revolubly mounted in said hopper support, and a pair of distributing fans each of which is revolubly mounted beneath the discharge openings in the casing aforesaid.

24. In a seeding machine, the combination of a removable end-gate for vehicles, a casing having a pair of feed openings central thereof, and discharge openings at its opposite ends, a right and left auger operating in the opposite ends of said casing, a hopper support mounted above said casing, an agitating shaft revolubly mounted in said hopper support, a pair of slide valves for closing the respective feed openings in said casing, a pair of distributing fans each of which is revolubly mounted beneath the discharge openings in the casing aforesaid, means for simultaneously actuating the augers and distributing fans, and means for actuating the agitating shaft.

In testimony whereof I affix my signature, in presence of two witnesses.

CHARLES P. SESTER.

Witnesses:
CHAS. N. LA PORTE,
LOUISE M. ADAMS.